United States Patent
Muniswamy-Reddy et al.

(10) Patent No.: US 11,336,723 B1
(45) Date of Patent: May 17, 2022

(54) REPLICATING DATA VOLUME UPDATES FROM CLIENTS ACCESSING THE DATA VOLUME ACROSS FAULT TOLERANCE ZONES

(71) Applicant: Amazon Technologies, Inc., Seattle, WA (US)

(72) Inventors: Kiran-Kumar Muniswamy-Reddy, Sammamish, WA (US); William Zaharchuk, Seattle, WA (US); Divya Ashok Kumar Jain, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/579,733

(22) Filed: Sep. 23, 2019

(51) Int. Cl.
    *G06F 15/16* (2006.01)
    *H04L 67/1095* (2022.01)
    *H04L 67/1034* (2022.01)

(52) U.S. Cl.
    CPC ...... *H04L 67/1095* (2013.01); *H04L 67/1034* (2013.01)

(58) Field of Classification Search
    CPC .............. H04L 67/1095; H04L 67/1034
    See application file for complete search history.

(56) References Cited

U.S. PATENT DOCUMENTS

| | | | |
|---|---|---|---|
| 7,325,046 B1* | 1/2008 | Novaes | G06F 9/5061 709/220 |
| 9,230,000 B1* | 1/2016 | Hsieh | G06F 16/2343 |
| 9,792,163 B1* | 10/2017 | Chrysanthakopoulos | H04L 67/42 |
| 10,346,063 B2 | 7/2019 | Zhang et al. | |
| 10,379,759 B2* | 8/2019 | Bhardwaj | G06F 16/2365 |
| 2007/0214194 A1 | 9/2007 | Reuter | |
| 2012/0143957 A1* | 6/2012 | Ganapathy | H04L 43/10 709/205 |
| 2019/0394284 A1* | 12/2019 | Baghel | H04L 67/1002 |
| 2020/0042222 A1* | 2/2020 | Ramaswamy | G06F 3/065 |
| 2020/0210243 A1* | 7/2020 | Li | H04L 67/1095 |

OTHER PUBLICATIONS

Divyakant Agrawal, "A Nonblocking Quorum Consensus Protocl for Replicated Data", , 1991 , IEEE (Year: 1991).*
U.S. Appl. No. 16/560,860, filed Sep. 4, 2019, Fan Ping.
U.S. Appl. No. 16/560,859, filed Sep. 4, 2019, Fan Ping.

\* cited by examiner

*Primary Examiner* — Ryan J Jakovac
(74) *Attorney, Agent, or Firm* — Robert C. Kowert; Kowert, Hood, Munyon, Rankin & Goetzel, P.C.

(57) ABSTRACT

Updates for clients accessing a data volume across fault tolerance zones may be replicated. Requests to write or read a block of a logical volume with replicas located in different fault tolerance zones may be sent to the different replicas. Responses for the different requests may be evaluated to determine whether quorum is satisfied for the write or read of the block of the logical volume. For writes that satisfy quorum, a request to commit the write may be sent to the replicas of the logical volume.

21 Claims, 13 Drawing Sheets

REPLICATING DATA VOLUME UPDATES FROM CLIENTS ACCESSING THE DATA VOLUME ACROSS FAULT TOLERANCE ZONES

BACKGROUND

Virtualization technologies have driven rapid growth in virtual or "cloud-based" systems, which may provide various public (or private) functions and services. service providers offer customers the opportunity to utilize virtualized computing resources on demand. Consumers of virtualized computing resources and storage, such as those offered by service providers, can flexibly structure their computing and storage costs in response to immediately perceived computing and storage needs. For instance, virtualization allows customers of a service provider to purchase processor cycles and storage at the time of demand, rather than buying or leasing fixed hardware in provisioning cycles that are dictated by the delays and costs of manufacture and deployment of hardware. This lessens the need to accurately predict future demand as customers are able to purchase the use of computing and storage resources on a relatively instantaneous as-needed basis. In another example, virtualization may distribute resources across different geographic locations or other infrastructure. Such techniques, may increase availability of the resources, providing multiple locations to access resources and the opportunity to isolate failure of resources to a respective location or other infrastructure.

Figure 1:
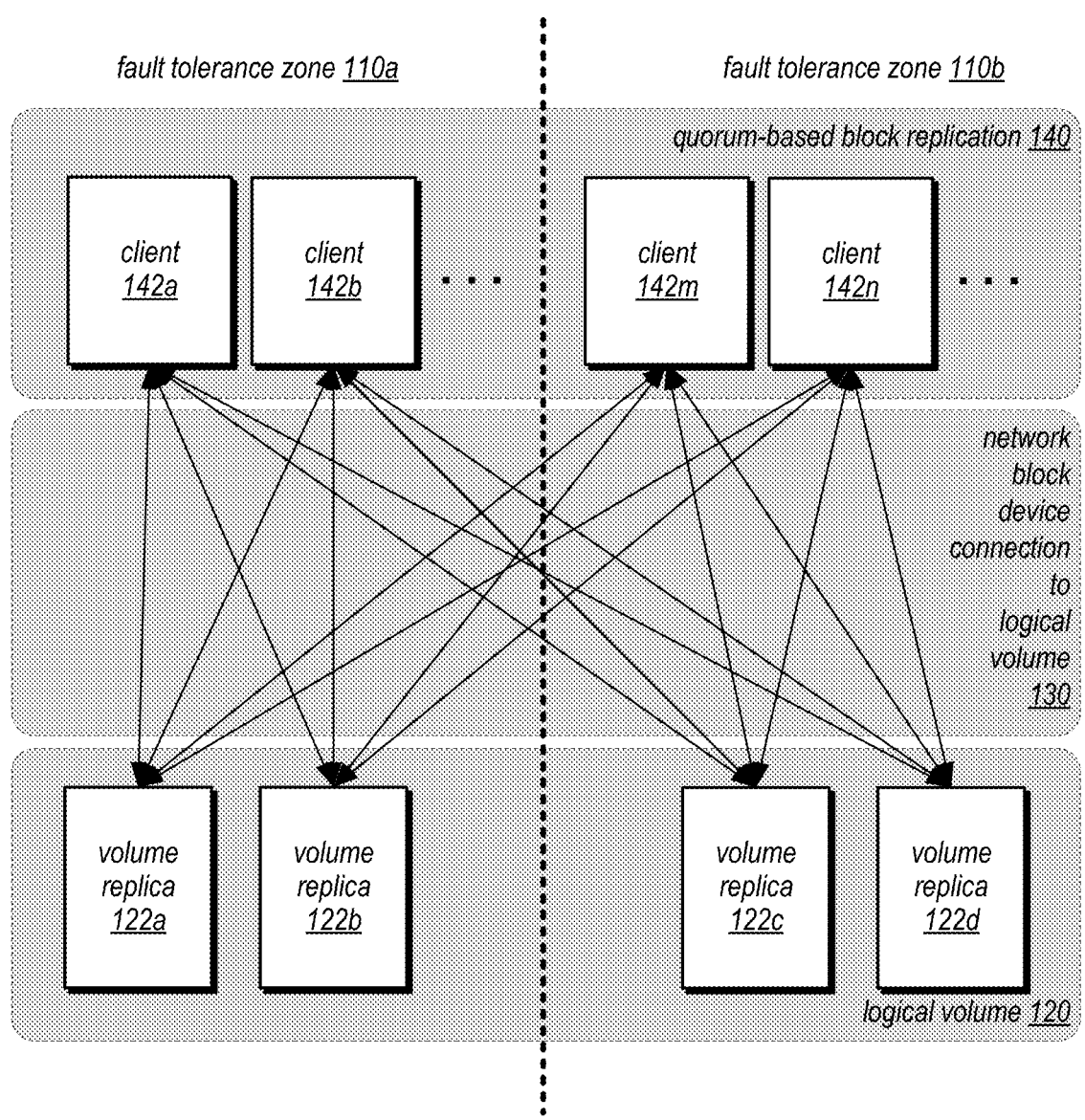
FIG. 1 is a logical block diagram illustrating replicating data volume updates from clients accessing the data volume across fault tolerance zones, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for replicating data volume updates from clients accessing the data volume across fault tolerance zones are described herein. Computing resources may be offered by service providers, or other systems, that allow customers, users, or other clients of a service provider to operate computing resources hosted by a service provider. These computing resources, such as the virtual compute instances discussed below with regard to FIG. 2, may be configured to operate customer-specified software (e.g., operating systems, applications, tools, services, etc.), which may be custom or off-the-shelf. For example, a customer of a service provider may procure a virtual compute instance to implement database software to implement a database server. The flexibility provided by utilizing virtual compute instances in a service provider allows customers to develop systems, services, or applications without investing in hardware resources for implementing the systems, services, or applications.

Network-based storage resources are often used in conjunction with computing resources that are clients of network-based storage resources, such as virtual compute instances. For example, as discussed below in FIG. 2, network-based storage resources may provide virtual block-based data volumes (e.g., virtualized disk storage) to instances. These virtual block-based data volumes may be attached to a client, a virtual compute instance, in order to serve as disk-based storage, providing the performance benefits of a service implementation of block-based storage, such as increased durability, availability, and operational flexibility.

Users, clients, or customers of service providers, such as provider networks, and other systems that utilize or offer computing and storage resources, may take advantage of the ability to utilize a resource at multiple different locations on different physicals resources, such as different server hosts, to introduce better availability and reliability into applications implemented using the resources. For example, service providers may implement different groups of infrastructure (e.g., groups of data centers, individual data centers, rooms within data centers, server racks, etc.) as fault tolerance zones, which may serve as failure boundaries that limit failures, such as correlated failures related to power, network connectivity, environmental conditions, and so on, to resources implemented or hosted within a fault tolerance zone. In various embodiments, a user can request different resources to be implemented across multiple fault tolerance zones. In this way, a failure of a resources located in one fault tolerance zone does not cause or correlate to a failure of another resource located in another fault tolerance zone.

While fault tolerance zones can be used to design and implement applications with greater resiliency, additional complexity to coordinate the actions of utilized resources across different fault tolerance zones may be introduced. For instance, while applications may implement replication techniques to ensure that updates are consistently propagated to two different replicas of the same data volume implemented in different fault tolerance zones, such as input/output (I/O) fencing or other overwrite prevent techniques, such techniques may increase the time and workload of applications to ensure accurate replication of the data volume. For example, a client application implemented in one fault tolerance zone may only be able to directly replicate changes to the replica of the data volume in that same fault tolerance zone in order to prevent another client application from overwriting changes made to the replica of the data volume.

Techniques for replicating data volume updates from clients accessing the data volume across fault tolerance zones may reduce the barriers to replicating updates to replicas of the data volume. For example, a client implemented in fault tolerance zone A along with a replica of a data volume may be able to replicate changes directly to another replica in fault tolerance zone B, without implementing (or utilizing) another client implemented in fault tolerance zone B (e.g., without first obtaining permission or a lock on a block or other portion of a data volume from another client in fault tolerance zone B). Moreover, multiple different clients located in different fault tolerance zones may be able to be connected to and actively utilize the same logical data volume replicated across the different fault tolerance zones, while implementing more performant replication techniques.

FIG. 1 is a logical block diagram illustrating replicating data volume updates from clients accessing the data volume across fault tolerance zones, according to some embodiments. Fault tolerance zones 110a and 110b, for instance, may be implemented as different data centers (or collections of data centers), different geographic regions, hardware, such as different server racks, different sources of power, different communication channels (e.g., different networks), different environmental controls (e.g., separate rooms of a data center with different cooling systems), or any other infrastructure that limits a type of failure (e.g., power, network, environmental, etc.) from affecting other fault tolerance zones, in various embodiments. Fault tolerance zones 110 may be implemented as part of a private system (e.g., that executes one or more on-premise applications executing on privately operated data centers) or may be implemented as part of a service provider, such as discussed below with regard to FIGS. 2-9D.

Logical volume 120 may be a block-based or block-level storage volume that organizes storage into blocks (e.g., a sequence of bits or bytes of a fixed size, such as 4096 bytes). Logical volume 120 may be replicated across fault tolerance zones 110a and 110b as different replicas, such as volume replicas 122a, 122b, 122c, and 122d. In some embodiments, each volume replica may represent a copy of the entire logical volume 120 or may represent a partial copy of at least some of the logical volume 120. As discussed below with regard to FIGS. 7 and 8, some replicas 122 may utilize logs, caches, or other features to store updates or some data that describes the state of a volume replica, which may not yet bet stored in a block that is targeted by an access request from a client 142.

In general, a volume can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume (or a particular replica, in scenarios where no given replica is designated as a primary) or another replica of the volume that is synchronized to the primary replica at a block level, such that a failure of either replica does not inhibit access to the information of the volume. The role of the primary replica (or any replica designated to connect to clients) can be to facilitate reads and writes (sometimes referred to as "input output operations," or simply "I/O operations") at the volume, and to propagate any writes to the other replica(s) (preferably synchronously in the I/O path, although asynchronous replication can also be used).

Figure 4:
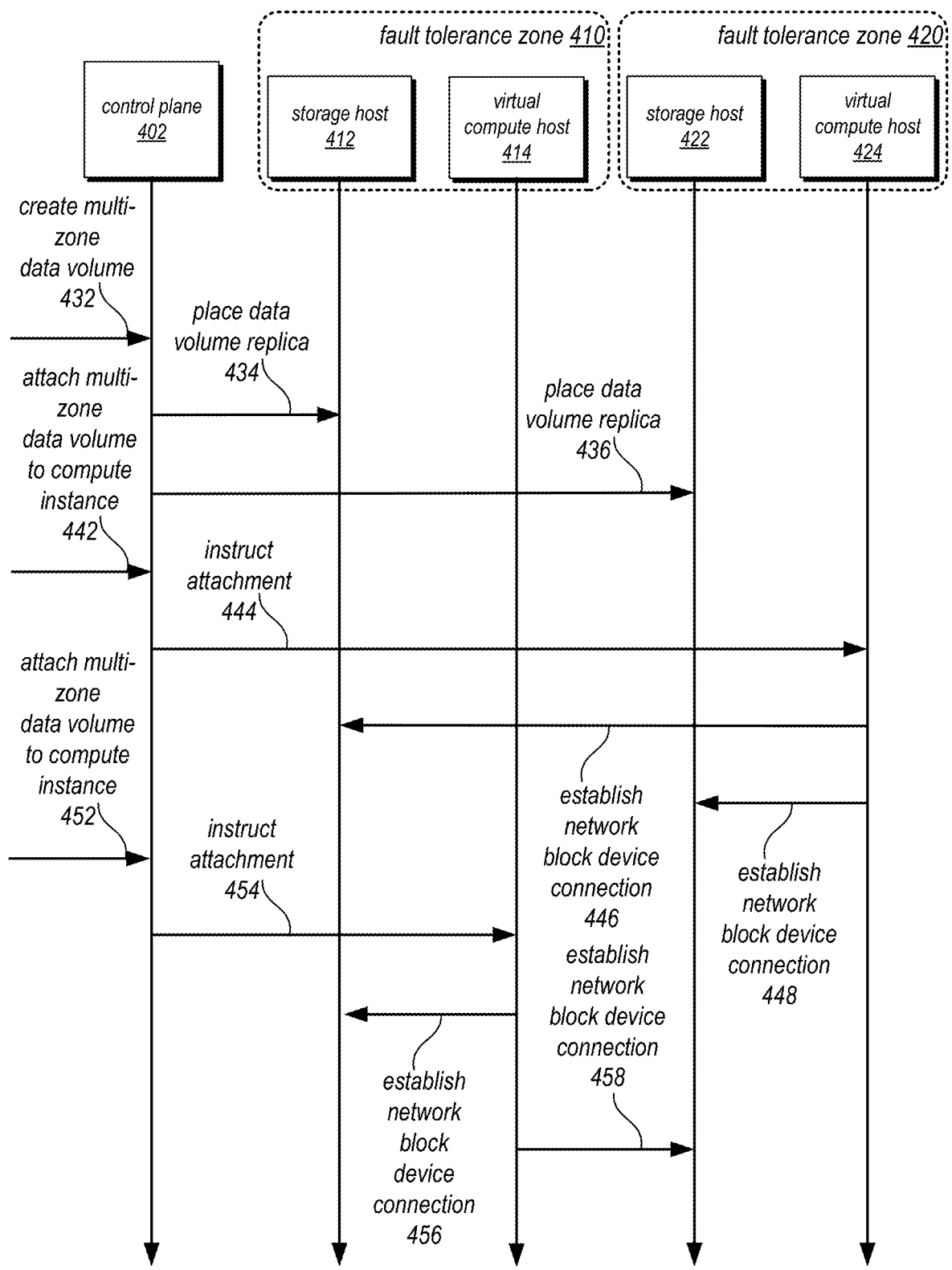
FIG. 4 is a logical block diagram illustrating interactions to create and attach a multi-zone data volume, according to some embodiments.

As discussed below with regard to FIG. 4, in some embodiments, logical volume 120 may be created or enabled as a multi-zone logical volume, spanning more than one fault tolerant one 110. As described herein, a cloud provider network can be formed as a number of regions, where a region is a geographical area in which the cloud provider clusters data centers. Each region can include two or more fault tolerance zones 110 (which are also referred to as zones, availability zones, or availability domains) connected to one another via a private high speed network, for example a fiber communication connection. A fault tolerance zone 110 refers to an isolated failure domain including one or more data center facilities with separate power, separate networking, and separate cooling from those in another fault tolerance zone 110. Preferably, fault tolerance zone 110 within a region are positioned far enough away from one other that the same natural disaster should not take more than one fault tolerance zone 110 offline at the same time. Customers can connect to fault tolerance zone 110 of the cloud provider network via a publicly accessible network (e.g., the Internet, a cellular communication network).

One or multiple clients 142 in each fault tolerance zone may be able to establish a network block device connection 130 to logical volume 120. For example, as illustrated in FIG. 1, clients 142a and 142b (e.g., I/O virtualization components of virtual compute instances or containers implementing an application) that are hosted in fault tolerance zone 110a may be able to establish a network connection to utilize block-based storage protocols, such as Internet Small Computer System Interface (iSCSI), to perform reads and writes to blocks of logical volume 120. A client, as referred to herein, represents instructions that enable a compute instance (or container) to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance or container. As illustrated in FIG. 1, instead of attaching a single volume replica to a single client 142 (which would limit the capability of an individual client to update logical volume 120 given that other clients attached in the same or different fault tolerance zone may also perform updates that could conflict), clients, such as clients 142a, 142b, 142m and 142n may establish connections with multiple (or all) volume replicas 122 across fault tolerance zones 110.

In various embodiments clients 142 may implement quorum-based block replication 140 for blocks of logical volume 120. Quorum rules, policies, or other evaluations may be applied to coordinate the performance of updates to logical volume 120. For instance, as discussed below with regard to FIGS. 5-6 and 10-11, requests to write to a data block may be proposed to multiple volume replicas, and if acknowledged by a number sufficient to create a write quorum, the write may be committed to the logical volume, and thus applied/performed with respect to the block targeted by the write. Similar techniques may be implemented for read requests for data blocks. As discussed below with regard to FIG. 4, quorum rules and policies may be specified for logical volume 120 (e.g., by a user via a control interface) to achieve different kinds of performance, durability, or availability goals (e.g., any 3 of 5 volume replicas acknowledging or at least 1 replica from each fault tolerance zone).

Please note that previous descriptions are not intended to be limiting, but are merely provided as logical examples of replicating data volume updates from clients accessing the data volume across fault tolerance zones. Various other communications, components, or timing of actions may be implemented. For instance, other systems such as a control plane for logical volumes may perform or participate in some of the described techniques.

This specification next includes a general description of a service provider, which may implement replicating data volume updates from clients accessing the data volume across fault tolerance zones. Then various examples of a virtual computing service and a virtual block-based storage service are discussed, including different components/modules, or arrangements of components/module that may be employed as part of implementing the virtual computing service and the virtual block-based storage service. A number of different methods and techniques to perform replicating data volume updates from clients accessing the data volume across fault tolerance zones are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
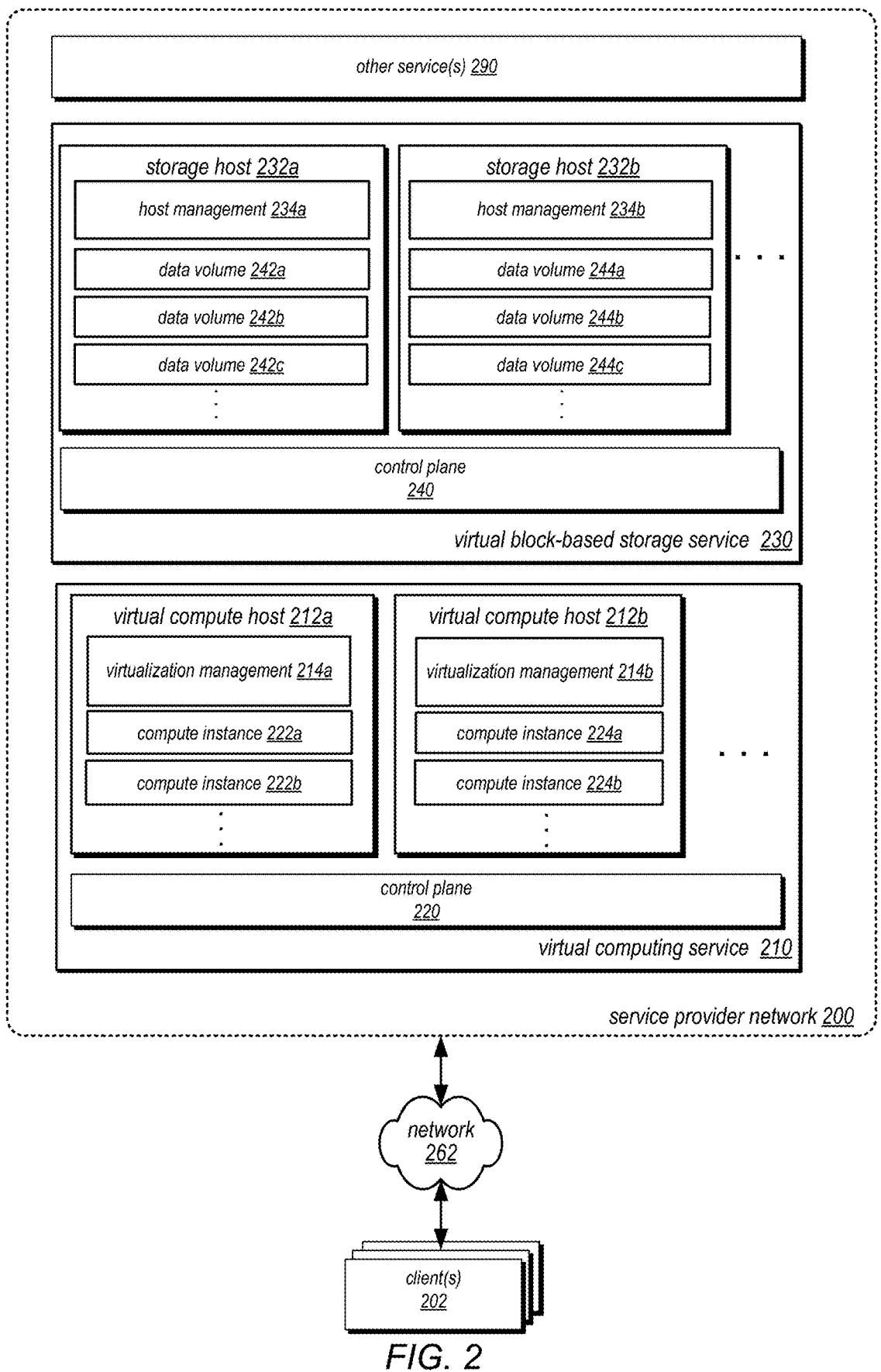
FIG. 2 is a logical block diagram illustrating a service provider that implements replicating data volume updates from clients accessing the data volume across fault tolerance zones, according to some embodiments.

FIG. 2 is a logical block diagram illustrating a service provider network 200 that implements replicating data volume updates from clients accessing the data volume across fault tolerance zones, according to some embodiments. The service provider network 200 may be a cloud provider network (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Service provider network 200 may be set up by an entity such as a company or a public sector organization to provide one or more services (such as various types of cloud-based or other network-based computing or storage) accessible via the Internet and/or other networks to clients 202. Service provider network 200 may include numerous data centers hosting various resource pools, such as collections of physical and/or virtualized computer servers, storage devices, networking equipment and the like, needed to implement and distribute the infrastructure and services offered by the service provider network 200. In some embodiments, service provider network 200 may provide computing resources. These computing resources may in some embodiments be offered to clients in units referred to as "compute instances" or "instances," such as compute instances 222a, 222b and 224a, 224b. In some embodiments computing resources may be containers, which package up code and all its dependencies so an application (also referred to as a task) can run quickly and reliably from one computing environment to another. Likewise, in some embodiments, service provider network 200 may provide storage resources, which may be offered to clients in units called data volumes, 242a, 242b, 242c and 244a, 244b, 244c, which may be virtual or physical block-based storage volumes (e.g., which may be individual replicas that collectively make up a logical volume, as discussed above with regard to FIG. 1).

Virtual computing service 210 may be implemented by service provider network 200, in some embodiments. Virtual computing service 210 may offer instances 222 and 224 according to various configurations for client(s) 202 operation. A virtual compute instance 222 and 224 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 222 and 224 of service provider network 200 in different embodiments, including general purpose or special purpose computer servers, storage devices, network devices and the like. In some embodiments instance client(s) 202 or other any other user may be configured (and/or authorized) to direct network traffic to a compute instance 202.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 202 to access an instance. Applications (or other software operated/implemented by a compute instance 222 and 224 may be specified by client(s) 202, such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, fault tolerance zone or region (as discussed below with regard to FIG. 3), geographic, location, and (in the case of reserved compute instances) reservation term length.

Figure 12:
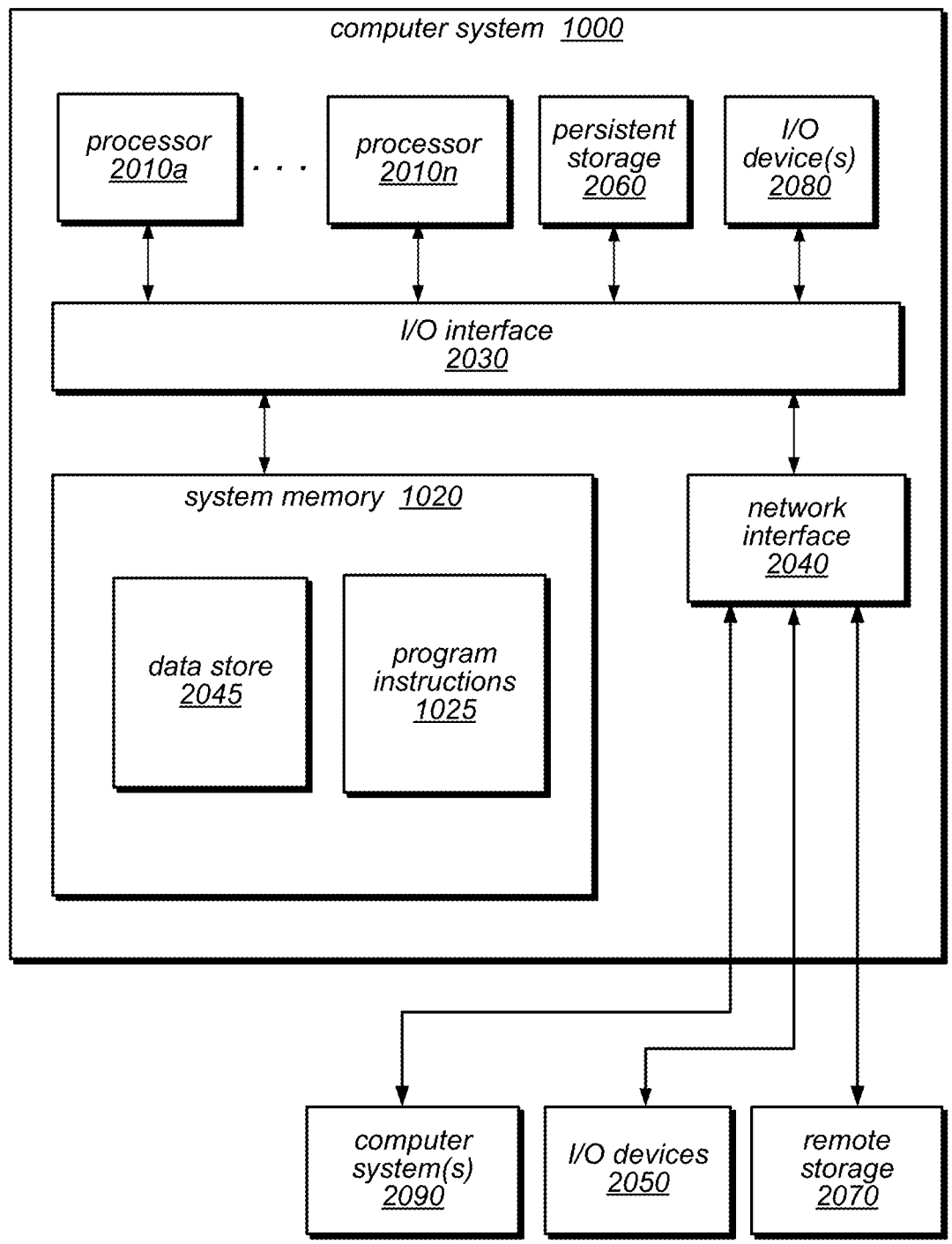
FIG. 12 is a block diagram illustrating an example computing system, according to some embodiments.

As illustrated in FIG. 2, a virtual compute host, such as virtual compute hosts 212a and 212b, may implement and/or manage multiple compute instances 222a, 222b, 224a, and 224b respectively, in some embodiments, and may be one or more computing devices, such as computing system 2000 described below with regard to FIG. 12. Virtual compute hosts 212 may also provide multi-tenant hosting of compute instances. For example, in some embodiments, one virtual compute host may host a compute instance for one entity (e.g., a particular client or account of virtual computing service 210), while another compute instance hosted at the same virtual compute host may be hosted for another entity (e.g., a different account). A virtual compute host may include a virtualization management platform, such as virtualization management 214a and 214b capable of instantiating and managing a number of different client-accessible virtual machines or compute instances. Virtualization management 214 may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances.

Virtual computing service 210 may implement control plane 220 to perform various management operations. For instance, control plane 220 may implement resource management to manage the access to, capacity of, mappings to, and other control or direction of compute instances offered by service provider. Control plane 220 may provide both a direct sell and $3^{rd}$ party resell market for capacity reservations (e.g., reserved compute instances). For example, control plane 220 may allow clients 202 via an interface to learn about, select, purchase access to, and/or reserve capacity for computing resources, either from an initial sale marketplace or a resale marketplace, via a web page or via an API. For example, control plane 220 may provide listings of different available compute instance types, each with different performance capabilities. Control plane 220 may also offer and/or implement a flexible set of resource reservation, control and access interfaces for clients 202 via an interface (e.g., API). For example, control plane 220 may provide credentials or permissions to clients 202 such that compute instance control operations/interactions between clients and in-use computing resources may be performed. In some embodiments, control plane 220 may implement live migration according to FIG. 3 and following.

In various embodiments, control plane 220 may track the consumption of various computing instances consumed for different virtual computer resources, clients, user accounts, and/or specific instances. In at least some embodiments, control plane 220 may implement various administrative actions to stop, heal, manage, or otherwise respond to various different scenarios in the fleet of virtual compute hosts 212 and instances 222, 224. Control plane 220 may also provide access to various metric data for client(s) 202 as well as manage client configured alarms. In various embodiments, control plane 220 may implement billing management module. Control plane 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

In various embodiments, service provider network 200 may also implement virtual block-based storage service 230 for offering block-based storage with the performance advantages of scalability, durability, and varying levels of automated maintenance or management. Virtual block-based storage service 230 is a storage system, composed of a pool of multiple independent storage hosts, such as storage hosts 232a and 232b, which provide block level storage for storing one or more sets of data volumes, such as data volume 242a, 242b, 242c, and 244a, 244b, 244c. Data volumes 242 and 244 may be attached to one or multiple client(s) (e.g., a virtual compute instance of virtual compute service 210), providing virtual block-based storage (e.g., virtual hard disk storage or other persistent storage) as a contiguous set of logical blocks. For example, in various embodiments, compute instances 224 may mount, attach, map or otherwise connect to one or more data volumes 242 and/or 244 provided by virtual block-based storage service 230 in order to obtain persistent block-based storage for performing various operations. For example, in various embodiments a data volume may serve as a boot volume or root volume, storing operating systems, applications, and/or other software executed on the compute instance mounting the respective boot volume. In some embodiments, a data volume may be divided up into multiple data chunks or partitions (including one or more data blocks) for performing other block storage operations, such as snapshot operations or replication operations. A volume snapshot of a data volume may be a fixed point-in-time representation of the state of the data volume. In some embodiments, volume snapshots may be stored remotely from a storage host 224 maintaining a data volume, such as in another storage service, such as one of other services 290. Snapshot operations may be performed to send, copy, and/or otherwise preserve the snapshot of a given data volume in another storage location, such as a remote snapshot data store in other storage service 290.

Storage hosts 232a, 232b may be one or more computing systems or devices, such as a storage server or other computing system (e.g., computing system 2000 described below with regard to FIG. 12) implementing storage devices, such as hard disk storage devices, flash-based (or other non-volatile storage devices), or any other block-based storage devices that may persistently store data volumes, in some embodiments. Each storage host may maintain respective replicas of data volumes. Some data volumes may differ in size from other data volumes, in some embodiments. Storage hosts may also provide multi-tenant storage. For example, in some embodiments, one storage host may maintain a data volume for one entity (e.g., a particular client or account of block-based storage service 230), while another data volume maintained at the same storage host may be maintained for another entity (e.g., a different account). Storage hosts may persist their respective data volumes in one or more block-based storage devices (e.g., hard disk drives, solid state drives, etc.) that may be directly attached to a computing system or device implementing the respective storage host. Storage hosts may implement different persistent storage devices. For example, some storage hosts may implement solid state drives (SSDs) for persistent block storage, while other storage hosts may implement hard disk drives (HDDs) or other magnetic-based persistent storage devices. In this way different volume types, specifications, and other performance characteristics may be provided according to the persistent storage devices implemented at the storage host.

Virtual block-based storage service 230 may manage and maintain data volumes in a variety of different ways. Host management 234a, 234b, may be implemented at storage hosts 232a and 232b respectively to manage data stored in different data volumes. Different durability schemes may be implemented for some data volumes among two or more storage hosts 232 as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In some embodiments, replication or mirroring techniques may be enabled, disabled, or modified according to whether a data volume is a multi-zonal data volume.

In order to provide access to a data volume, storage hosts may then perform I/O requests, such as write requests or read requests, among the storage hosts maintaining a replica of a data volume. For example, as discussed below with regard to FIGS. 5-6 and 10-11, quorum-based replication techniques may be implemented to ensure data volumes implemented across fault tolerance zones are consistent by allowing clients implemented at attached compute instances 222 and 224 to perform writes or reads to replicas of data volumes stored at different hosts at different fault tolerance zones according to quorum policies, as discussed below. In scenarios where a data volume is not hosted across fault tolerance zones, replication techniques may be implemented by storage hosts alone in order to maintain multiple copies in the single fault tolerance zone for durability or availability. For example, for a given data volume, one storage host may serve as a master storage host. A master storage host may, in various embodiments, receive and process requests (e.g., I/O requests) from clients of the data volume. Thus, the master storage host may then coordinate replication of I/O requests, such as write requests, or any other changes or modifications to the data volume to one or more other storage hosts serving as slave storage hosts. Thus, when a write request is received for the data volume at a master storage host, the master storage host may forward the write request to the slave storage host(s) and wait until the slave storage host(s) acknowledges the write request as complete before completing the write request at the master storage host. Master storage hosts may direct other operations for data volumes, like snapshot operations or other I/O operations (e.g., serving a read request).

Please note, that in some embodiments, the role of master and slave storage hosts may be assigned per data volume. For example, for a data volume maintained at one storage host, the storage host may serve as a master storage host. While for another data volume maintained at the same storage host, the storage host may serve as a slave storage host.

Data may be maintained in data volumes 242, 244 in such a way as to provide security and privacy guarantees for client(s) 202. Host management 234a may enforce access policies for individual data volumes, limiting access to data in data volumes to those requestors that satisfy the access policy (e.g., by presenting appropriate identification or credentials). In this way, data stored in different data volumes on the same storage host for different clients may be confidentially maintained so that an unauthorized request to access data may not be processed (even if the requestor has the right to access another data volume hosted at the same storage host).

Virtual block-based storage service 230 may implement control plane 240 to assist in the operation of block-based storage service 230. In various embodiments, block-based storage service control plane 222 assists in managing the availability of block data storage to clients, such as programs executing on compute instances provided by virtual compute service 210 and/or other network-based services 290 located within service provider network 200 and/or optionally computing systems (not shown) located within one or more other data centers, or other computing systems external to service provider network 200 available over a network 262. Access to data volumes 242, 244 may be provided over an internal network within service provider network 200 or externally via network 262, in response to block data transaction instructions.

Block-based storage service control plane 240 may provide a variety of services related to providing block level storage functionality, including the management of user accounts (e.g., creation, deletion, billing, collection of payment, etc.), such as those techniques discussed below regarding FIGS. 4 and 9A-9D. Control plane 240 may further provide services related to the creation, usage and deletion of data volumes 242, 244 in response to configuration requests. Control plane 240 may also provide services related to the creation, usage and deletion of volume snapshots on another storage service 262. Control plane 240 may also provide services related to the collection and processing of performance and auditing data related to the use of data volumes 242, 244 and snapshots of those volumes.

Clients 202 may encompass any type of client configurable to submit requests to service provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at service provider network 200 on behalf of a client 202.

Clients 202 may convey network-based services requests to service provider network 200 via external network 262. In various embodiments, external network 262 may encompass any suitable combination of networking hardware and protocols necessary to establish network-based communications between clients 202 and service provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and service provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and service provider network 200. It is noted that in some embodiments, clients 202 may communicate with service provider 202 using a private network rather than the public Internet.

Figure 3:
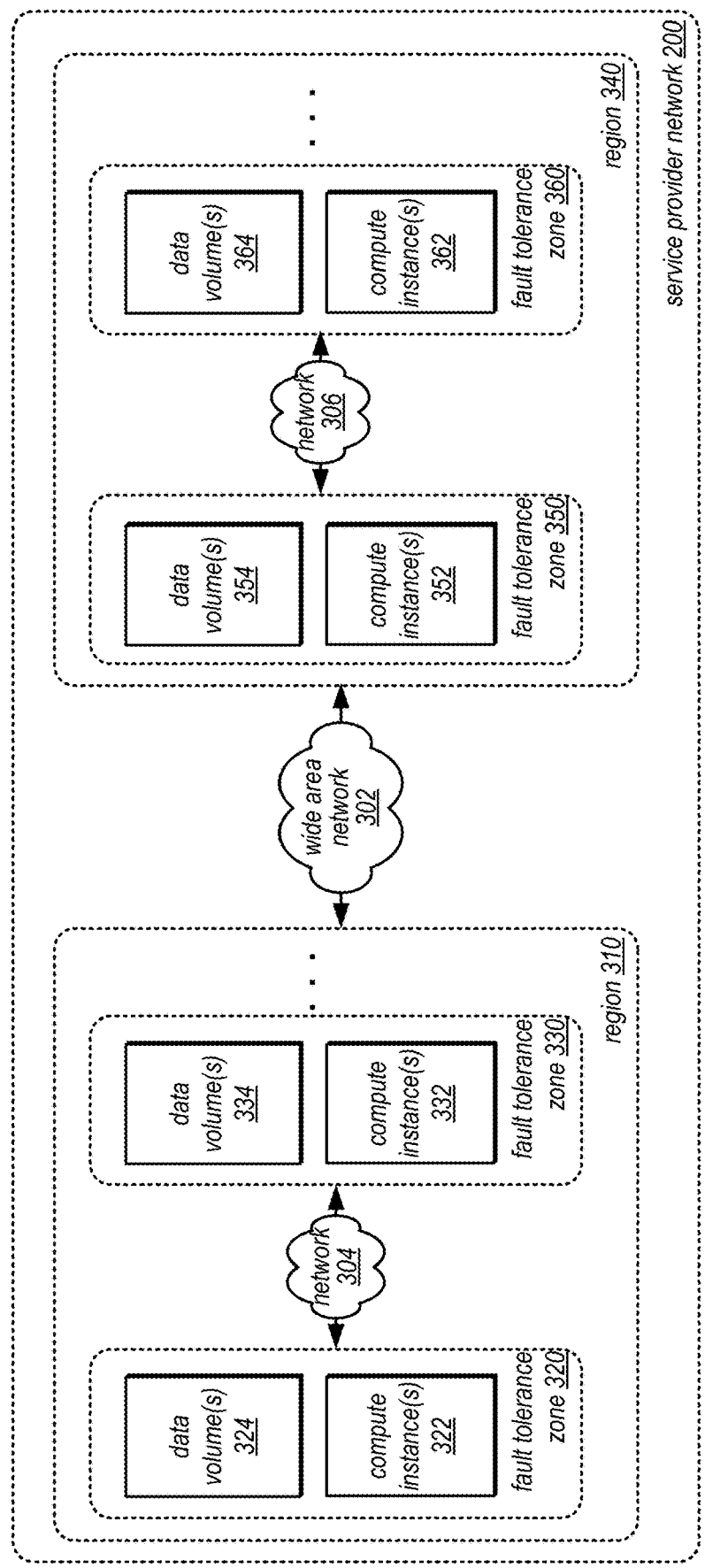
FIG. 3 is a logical block diagram illustrating different possible resource placements for a service provider, according to some embodiments.

As noted above, fault tolerance zones offer users with the ability to specify various amounts or types of performance, availability, and durability features for applications utilizing resources of a service provider. FIG. 3 is a logical block diagram illustrating different possible resource placements for a service provider, according to some embodiments. For example, service provider network 200 may offer different regions, such as regions 310 and 340. Each region may be a geographic area, in some embodiments, which may offer best performance for external clients, systems, or devices within the geographic area. For example, a client device located in region 310 may receive best performance when utilizing an application implemented in region 310 of service provider network 200. In this way, users can identify regions nearest users of applications implemented in service provider network 200 to provide a best performance location for the application.

Communications between regions (or from other external systems) may be sent via a wide area network 302 (e.g., the Internet). Therefore, private network communications may not be supported between region 310 and 340, in some embodiments (although encryption or other security features could be implemented to protect information traversing between the regions in wide area network 302). Within a region, however, communications may traverse private networks, such as networks 304 and 306. For instance, a compute instance 322 hosted in fault tolerance zone 320 may send a communication to a compute instance 332 via a private network 304 of service provider network 200, even though the compute instances are in different fault tolerance zones, 320 and 330.

As discussed above fault tolerance zones may be implemented to limit failure so that the availability of resources implemented within a fault tolerance is. A region may implement multiple fault tolerance zones (e.g., fault tolerance zones 320 and 330 in region 310 and fault tolerance zones 350 and 360 in region 340). Each fault tolerance zone may implement resources, such as data volume(s) 324 and compute instance(s) 322 in fault tolerance zone 320, data volume(s) 334 and compute instance(s) 332 in fault tolerance zone 330, data volume(s) 354 and compute instance(s) 352 in fault tolerance zone 350, and data volume(s) 364 and compute instance(s) 362 in fault tolerance zone 360. In at least some embodiments, multi-zone resources, such as a multi-zone volume, may be implemented within the fault tolerance zones of a single region.

Virtual block-based storage service 230 and/or virtual compute service 210 may implement a control interface (e.g., a graphical user interface, web-based console, command line interface, or programmatic interface, such as an Application Programming Interface (API)) to create and attach to logical data volumes across multiple fault tolerance zones. FIG. 4 is a logical block diagram illustrating interactions to create and attach a multi-zone data volume, according to some embodiments. For example, as indicated at 432, a request to create a multi-zone data volume 432 may be received at a control plane 402 (e.g., a control plane for virtual block-based storage service 230 and/or virtual compute service 210). The creation request 432 may specify how many replicas, and which fault tolerance zones to place them (e.g., the same in each fault tolerance zone or different, specified numbers in each fault tolerance zone). In some embodiments, the creation request 432 may specify a quorum policy to be stored as part of metadata for the multi-zone data volume, which may provide information to control plane 402 to handle various scenarios (e.g., whether, when, or how to replace a failed replica of the volume, adding a replica to increase I/O capacity, removing a replica to decrease I/O capacity, etc.). In some embodiments, creation request 432 may specify scaling or replacement limits (e.g., a limit on the number of replicas in a fault tolerance zone (or a minimum number of replicas to be maintained in a fault tolerance zone).

Control plane 402 may place data volumes at hosts in different fault tolerance zones. For example, control plane 402 may place 434 one data volume replica at storage host 412 (e.g., on physical storage server that implements a storage host) in fault tolerance zone 410 and place 436 another data volume replica at storage host 422 (e.g., on a different physical storage server that implements the storage host) in fault tolerance zone 420. Control plane 402 may enforce or implement placement controls to ensure distribution of data volume replicas to minimize correlated failures and thus may direct placements in different fault tolerance zones (e.g., replicas may have to have at least one replica in two (or more) fault tolerance zones).

Control plane 402 may also handle a request to attach a multi-zone data volume to a compute instance, such as request 442. The request may specify the compute instance and multi-zone data volume. As indicated at 444, control plane may instruct the attachment 444 to the virtual compute host 424 for the instance. Information to establish a network block device connection may be provided as part of the instruction (e.g., network address or identifiers of storage hosts 412 and 422, user credentials for accessing the storage volumes, quorum policy information, etc.). As indicated at 446, virtual compute host 424 may establish a network block device connection 446 with storage host 412 in another fault tolerance zone 410. Virtual compute host 424 may also establish a network block device connection with storage host 422 in fault tolerance zone 420.

Similar interactions may be performed to attach an additional client to the same logical volume. For instance, virtual compute host 414 may implement another client of the same multi-zone data volume. A request to attach the multi-zone data volume 452 to virtual compute host 414 may be received, causing control plane 402 to instruct virtual compute host 414 to prepare to access the same logical volume. Virtual compute host 414 may send one or more requests, messages, or other interactions to establish a network block device connection 458 with a replica in another fault tolerance zone, like storage host 424, as well as establishing a network block device connection 456 with a replica of the logical data volume in fault tolerance zone 410.

Figure 5:
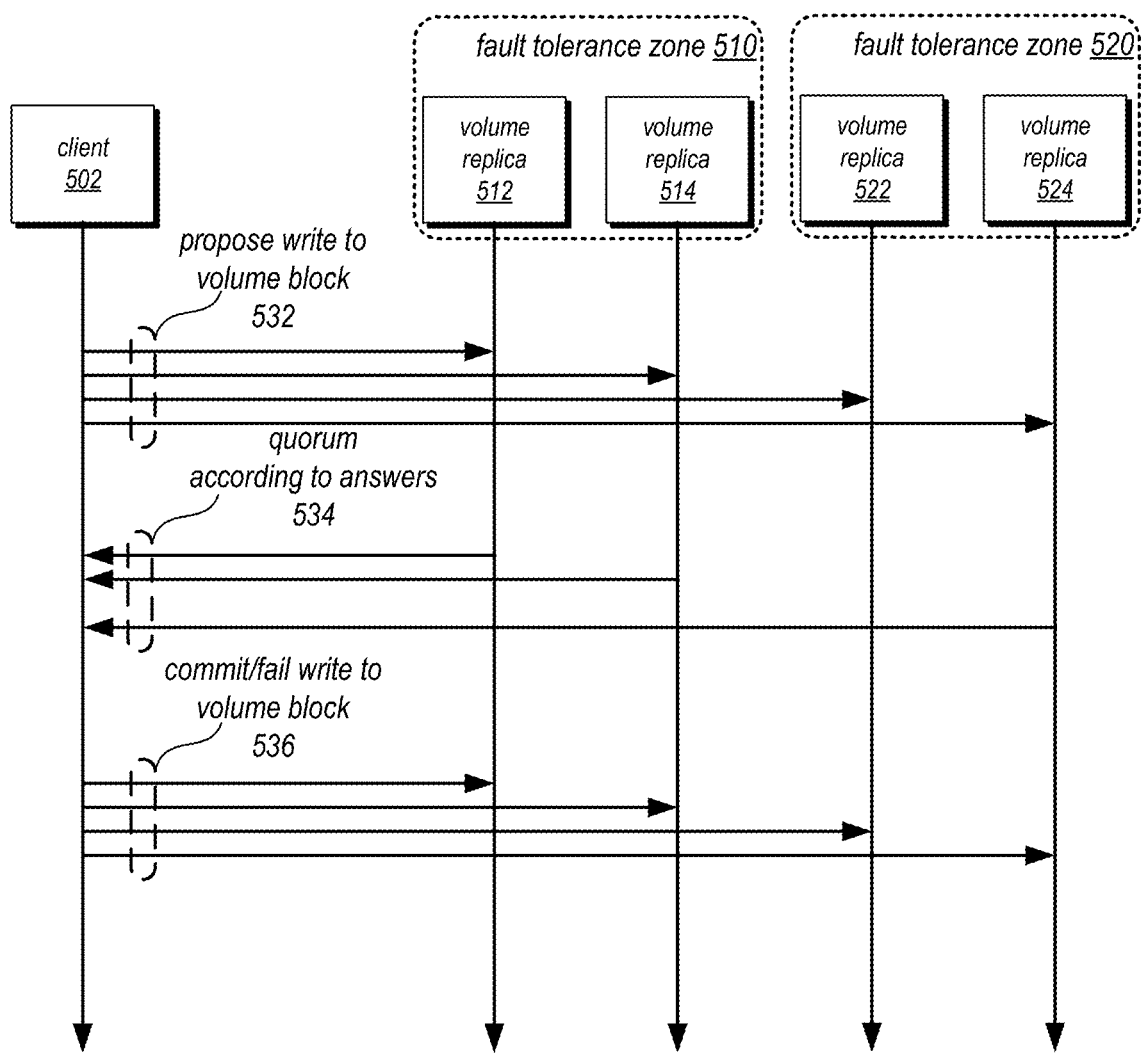
FIG. 5 illustrates interactions for a write quorum protocol for replicating updates across fault tolerance zones, according to some embodiments.

As discussed above with regard to FIG. 1, different quorum rules or policies may be applied or evaluated to replicate updates across fault tolerance zones. FIG. 5 illustrates interactions for a write quorum protocol for replicating updates across fault tolerance zones, according to some embodiments. Client 502, which may be a virtual compute instance implementing an application, may propose a request to write to a volume block, as indicated 532. For example, a block-device protocol (e.g., iSCSI) may allow client 502 to specify the logical block address of the block to write to, as well as the data to write (or delete). In some embodiments, the proposal 532 may include a logical sequence number (LSN) (e.g., a monotonically increasing value), timestamp, or other indication that identifies an ordering for writes, which a storage host may utilize to determine whether a write quorum is satisfied from the answers 534. The proposal may be sent 532 to all storage hosts for volume replicas or a least a number sufficient to satisfy a write quorum for the write. For example, as illustrated in FIG. 5, the proposal 532 may be sent to volume replicas 512 and 514 in fault tolerance zone 510 and volume replicas 522 and 524 in fault tolerance zone 520. Client 502 may be implemented in either of fault tolerance zone 510 or 520 or another fault tolerance zone (not illustrated, which may not implement a volume replica). In some embodiments, client 502 may submit proposals in a priority order (e.g., first local fault tolerance zone, then a remote fault tolerance zone).

As indicated at 534, quorum may be determined according to proposal answers received at client 502 from the different volume replicas (e.g., 3/4 replicas answered as illustrated in FIG. 5). Although not illustrated, in some scenarios no proposal answers or less than all proposal answers may be sent or received (e.g., due to network errors, volume replica failures, etc.). Proposal answers may indicate whether or not the volume replica accepts the proposed write to the block, in some embodiments. For example, if the proposal includes a logical sequence number with a value higher than any other logical sequence number for other updates committed to the logical volume, then the proposal may be accepted. If, however, the logical sequence number is less than a logical sequence number for a committed update at the replica, then the proposal may be rejected (e.g., as the request to write would overwrite a later change committed to the block).

If enough proposal answers satisfy the write quorum, then client 502 may send a request 536 to commit the write to the volume block to volume replicas 512, 514, 522, and 524. If the write quorum is not satisfied, then client 502 may send a fail or abort write request to volume replicas 512, 514, 522, and 524.

Figure 6:
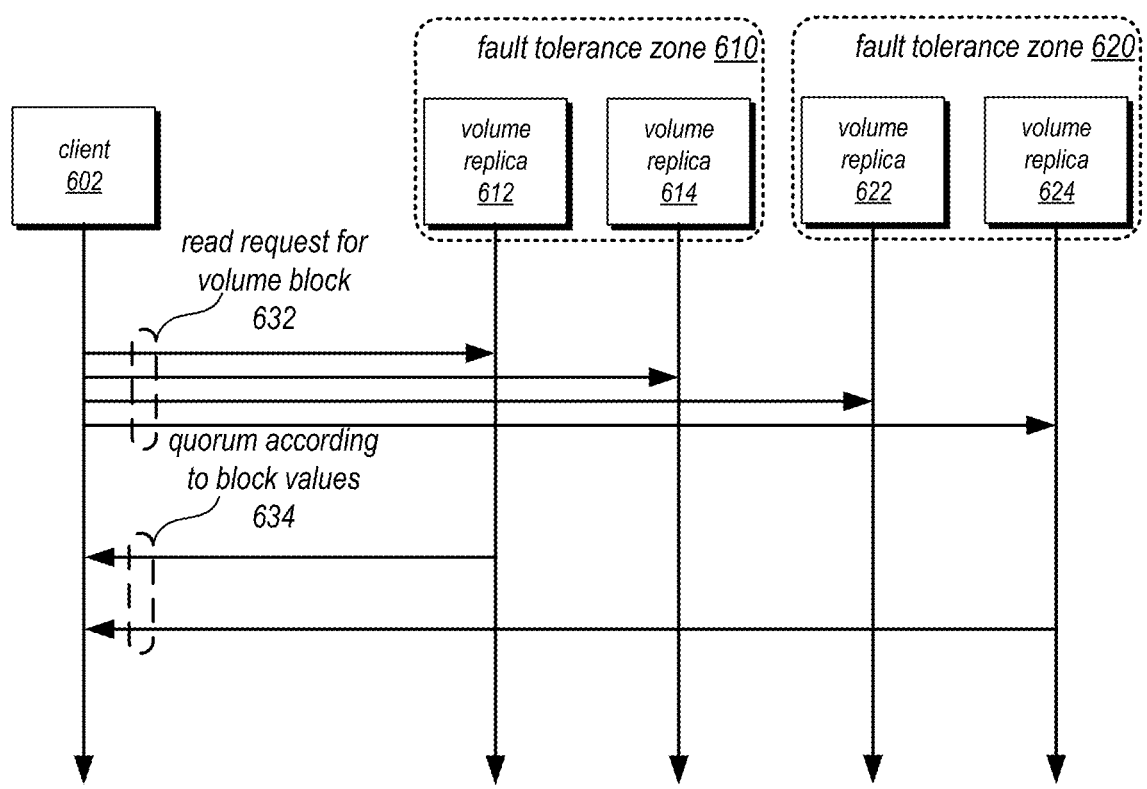
FIG. 6 illustrates interactions for a read quorum protocol for replicating updates across fault tolerance zones, according to some embodiments.

FIG. 6 illustrates interactions for a read quorum protocol for replicating updates across fault tolerance zones, according to some embodiments. Similar to FIG. 5 above, a client 602 may perform a read request 632 for a logical block address of a multi-zone data volume. The read request 632 may be sent to volume replicas 612 and 614 in fault tolerance zone 610 and volume replicas 622 and 624 in fault tolerance zone 624, in some embodiments. In some embodiments, the read request 632 may be sent to different volume replicas according to an order that prioritizes locality (e.g., the same fault tolerance zone as the client 602 first before other fault tolerance zones).

Based on the returned block values 634, client 602 can determine the value for the block by determining whether a read quorum is satisfied. For example, if a write quorum is 3/4 replicas, then a read quorum may be any 2/4 replicas that agree on the same block value (as if the block value is committed to at least the 3, then at most only 1 replica will be different than other replicas), as illustrated in FIG. 4. Other quorum policies different than those illustrated in FIGS. 5 and 6 may be enforced in other embodiments, such as quorum policies that require at least one replica to respond in each fault tolerant zone.

Although not illustrated, in at least some embodiments, a client, such as client 602 may check a cache for block reads before performing a quorum read. For example, client 602 may send a read request to one local storage host in the same fault tolerance zone, such as a read request to a storage host for volume replica 612. The storage host may first check a cache of blocks (the values of which may have been previously read) to see if the block is present and valid (e.g., a cached block may become invalid when a request to write the block is received at the storage host or an indication of a write request to that block is received from another host). If valid, the cached value of the block may be returned. If not valid, a cache miss indication may be returned, in some embodiments. In other embodiments, client 602 may implement the cache and may receive block invalidations for successful committed writes from a storage host of a volume replica. Cache invalidations messages (not illustrated) may be received at the location that implements the cache (e.g., storage host or client) and may indicate individual or a range of data blocks where the cache value is no longer valid because of a committed write to the data blocks).

Figure 7:
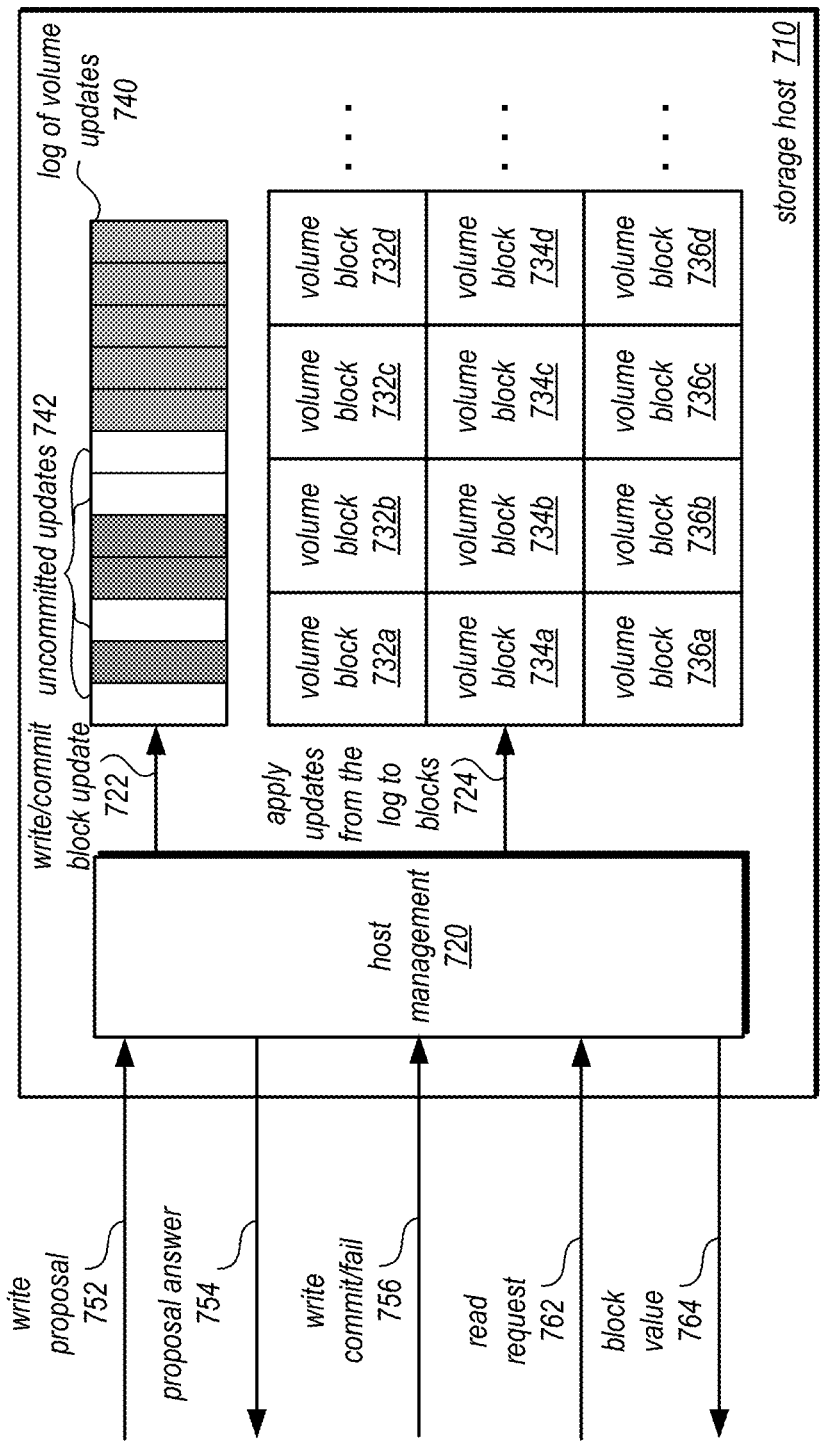
FIG. 7 is a logical block diagram illustrating an example storage host, according to some embodiments.

FIG. 7 is a logical block diagram illustrating an example storage host, according to some embodiments. As discussed above, storage hosts may participate in the implementation of a quorum-based replication across fault tolerance zones, in some embodiments. For example, storage host 710 may implement host management 720 which may handle requests to write to a block of a multi-zone block, such as a write to one of volume blocks, 732a, 732b, 732c, 732d, 734a, 734b, 734c, 734d, 736a, 736b, 736c, and 736d.

Host management 720 may manage a log of volume updates 740, in some embodiments. When a write request is received, such as write proposal 752, host management 720 may record the update as uncommitted 742. In some embodiments, host management 720 may check to see if the write request conflicts with a committed write (e.g., by comparing a logical sequence number or timestamp with a latest timestamp for the volume block targeted by the write request (which may be in the log of volume updates or stored as part metadata/header information for/in the volume block)). Host management 720 may send the proposal answer 754 (e.g., deny or accept the write proposal). A write commit/fail 756 may be sent to host management 720. Host management 720 may mark the update as committed (e.g., illustrated as darkened) or remove the failed write (or mark for deletion) in log of updates 740.

Host management 720 may, as a background process, read updates from log of volume updates, apply the updates from the log 724 to the respective volume blocks, and then remove the updates from the log 740. When read request 762 is received, host management 720, in some embodiments, may look for the latest version of the volume block, by first checking the log of volume updates 740 before the actual volume block, to make sure no committed updates in the log 740 need to be applied. If no applicable updates are found in the block, then the volume block value 734 may be returned 764 without modification. If updates are found in the log 740, then the block value 734 may be modified according to the updates and returned 764.

Figure 8:
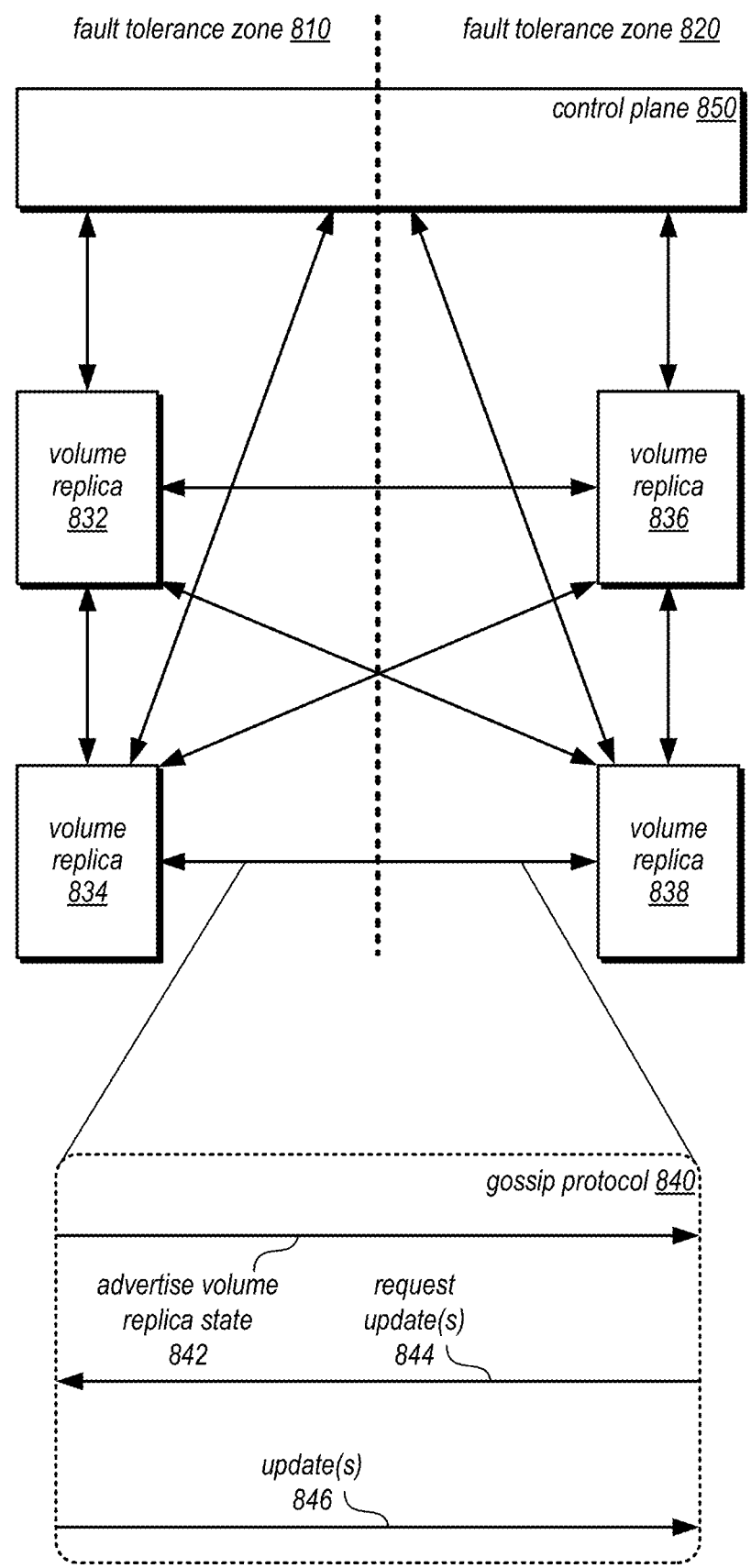
FIG. 8 is a logical block diagram illustrating an example gossip protocol for volume replicas involved in a quorum-based replication across fault tolerance zones, according to some embodiments.

As a quorum-based replication protocol could theoretically result in some volume replicas continuing to lag behind the committed state of the volume, techniques to synchronize the volume replicas in the background may be implemented, in some embodiments. FIG. 8 is a logical block diagram illustrating an example gossip protocol for volume replicas involved in a quorum-based replication across fault tolerance zones, according to some embodiments. For instance, if for volume replicas, 832, 834, 836, and 838 are implemented across two different fault tolerance zones 810 and 820, a gossip protocol 840 may be implemented between the different volume replicas (which may be managed/performed by host management for a storage host for the volume replicas, similar to host management 720 in FIG. 7 and host management 234 in FIG. 2) in order to provide a background process to eventually synchronize all volume replicas (or ensure that each volume replica keeps progressing the state of the volume replica).

Gossip protocol 840 may include different communications, in various embodiments. For example, in a push-based model, volume replicas may send an indication 842 to advertise volume replica state (e.g., by timestamp or logical sequence number) when volume replica state advances (e.g., when a write is committed) or at periodic intervals, in some embodiments. In another example using a pull-based model, volume replicas may send indication 842 when requested by another volume replica (not illustrated).

A volume replica can determine if it is missing committed updates by comparing the advertised replica state with its own replica state. If behind, then a request for update(s) 844 may be sent. Another replica can send copies of updated blocks or entries from an update log as updates 846, in some embodiments.

In at least some embodiments a control plane, such as control plane 850, may also participate in and/or coordinate updates to replicas according to information exchanged in the gossip protocol. For instance, volume replicas may share information, such as replica state, with control plane 850.

Control plane 850 may then direct or coordinate updating a lagging volume replica, in some embodiments (e.g., by sending an instruction to apply one or more updates provided from the control plane or another replica to the volume replica).

Figure 9A:
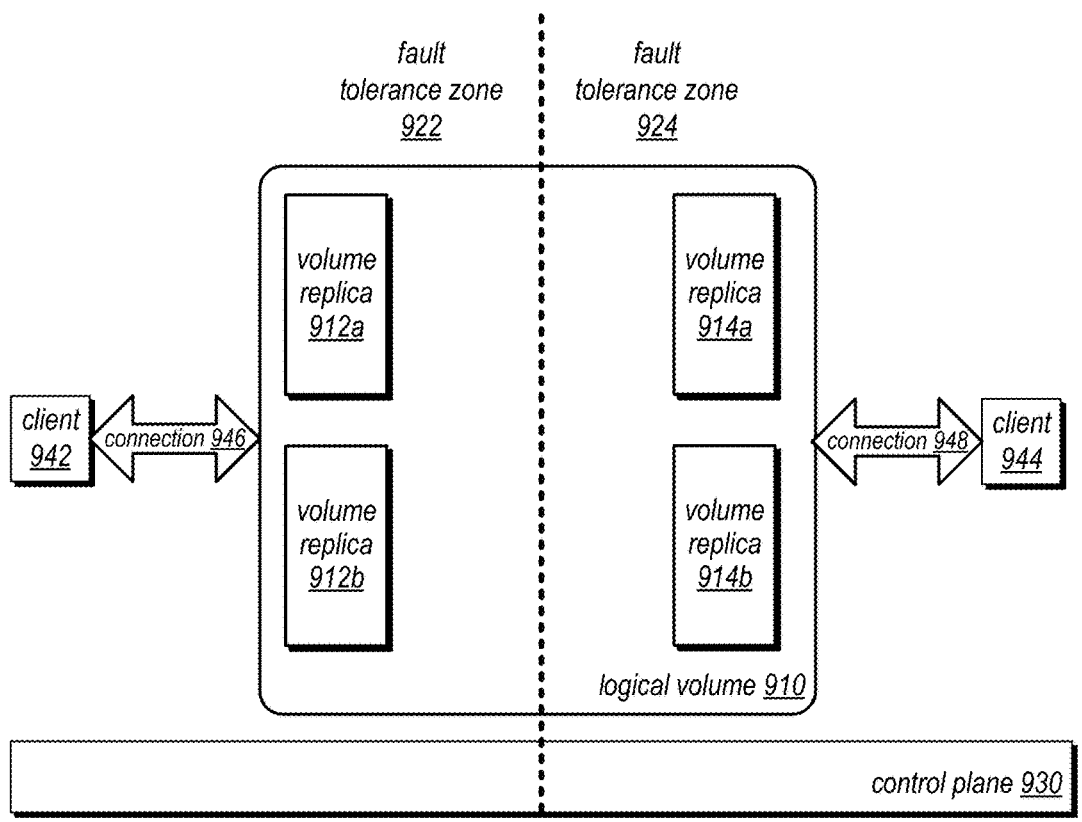
FIGS. 9A-9D are a series of logical block diagram illustrating quorum set changes, according to some embodiments.

FIGS. 9A-9D are a series of logical block diagram illustrating quorum set changes, according to some embodiments. In FIG. 9A, logical volume 910 may be a multi-zone volume that includes volume replicas 912a and 912b in fault tolerance zone 922 and volume replicas 914a and 914b in fault tolerance zone 924. Client 942 located in fault tolerance zone 922 may have established a network block device connection 946 with logical volume 910. Similarly, client 944 located in fault tolerance zone 924 may have established a network block device connection with logical volume 910. Such connections may have been established by attachment requests to control plane 930 (not illustrated), which may be similar to those discussed above with regard to FIG. 4.

Figure 9B:
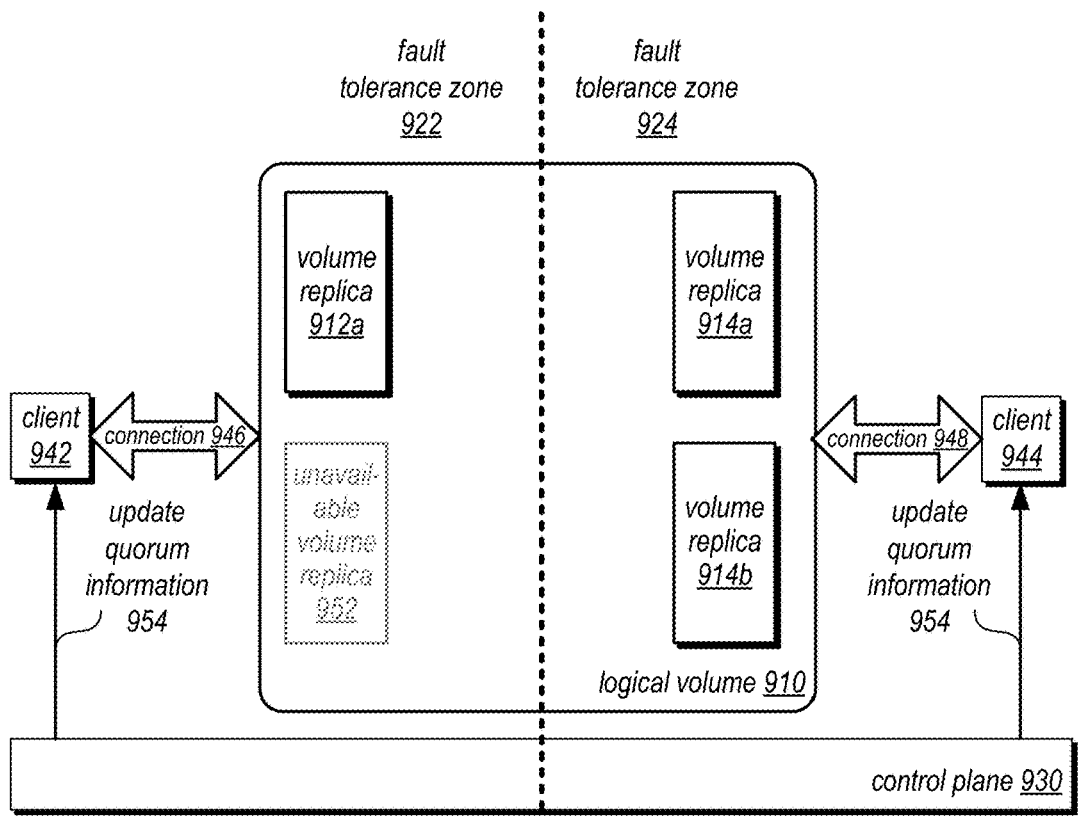

In FIG. 9B, one of the volume replicas becomes unavailable 952. Control plane 930 may track health and/or status of volume replicas, in various embodiments, and may detect the unavailability of the volume replica 952. In some embodiments, control plane 930 may modify the quorum set and quorum rules, based on the unavailability and send updated quorum information 954 to clients 942 and 944. In this way, clients 942 and 944 may be able to still satisfy quorum rules or policies to accomplish writes and reads. For instance, the quorum rules or policies for read or writes may be lowered by one to account for the unavailability of volume replica 952).

Figure 9C:
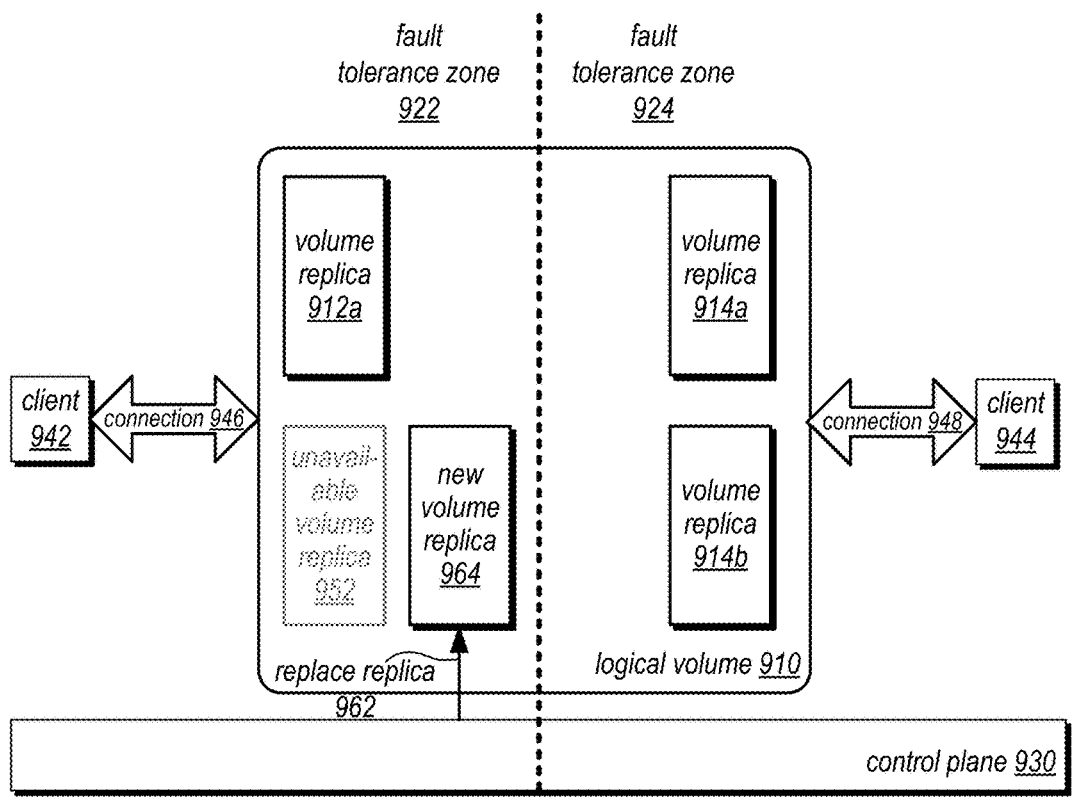

In FIG. 9C, control plane 930 may prepare a new volume replica 954 to replace 952 the unavailable one (or, alternatively, heal the unavailable volume replica). For instance, control plane 930 may provision a new storage host (or identify an available storage host with capacity to store another volume replica in addition to existing volume replica(s) at that storage host) and begin operations to copy the block data (e.g., block-based physical copy protocols, file transfer protocols, or logical replication techniques (e.g., by applying an update log to a snapshot of the volume)) to generate the data of a volume replica at new volume replica 964.

Figure 9D:
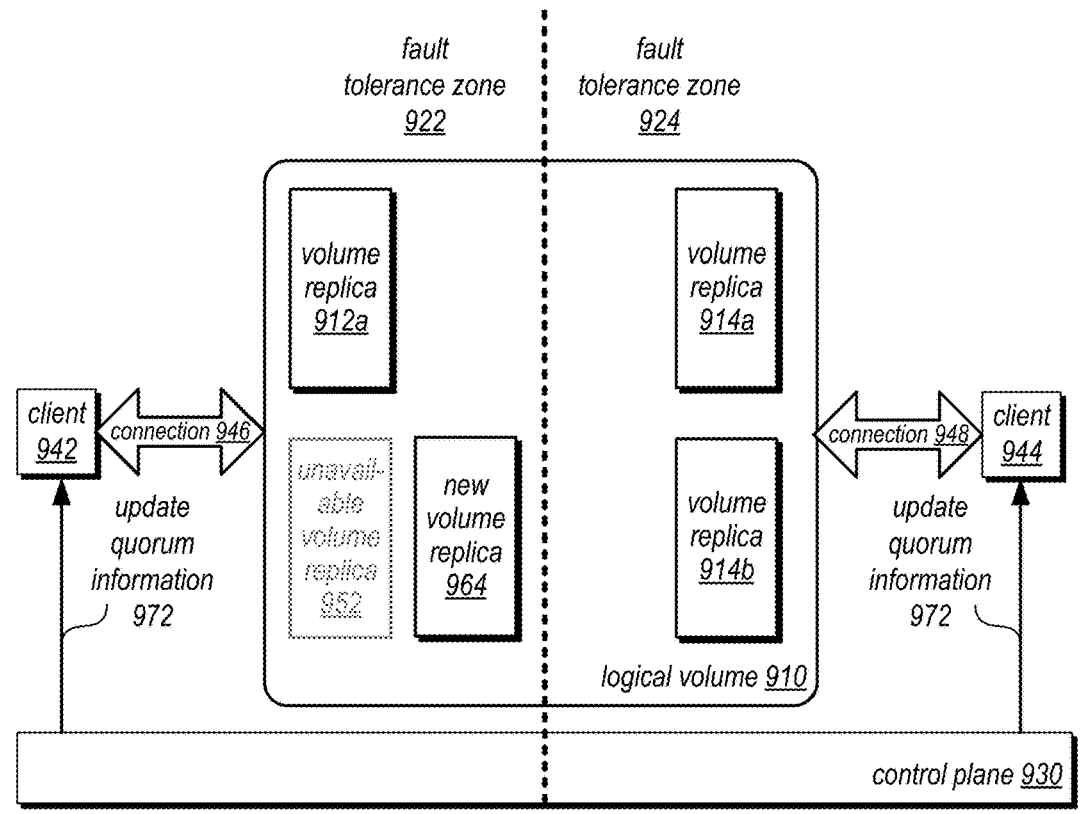

As indicated in FIG. 9D, when the replacement is ready, control plane 930 may again update clients 942 and 944 with new quorum set and rule/policy information, which includes new volume replica 954. For instance, the quorum rules or policies may be increased by one to account for the addition of new volume replica 964. Similar techniques to those discussed above in FIGS. 9A-9D can be used to increase or decrease the number of replicas even if a failure or other unavailability of a volume replica has not occurred (e.g., in response to dynamic scaling of volume replicas based on workload or user request), in some embodiments.

Figure 10:
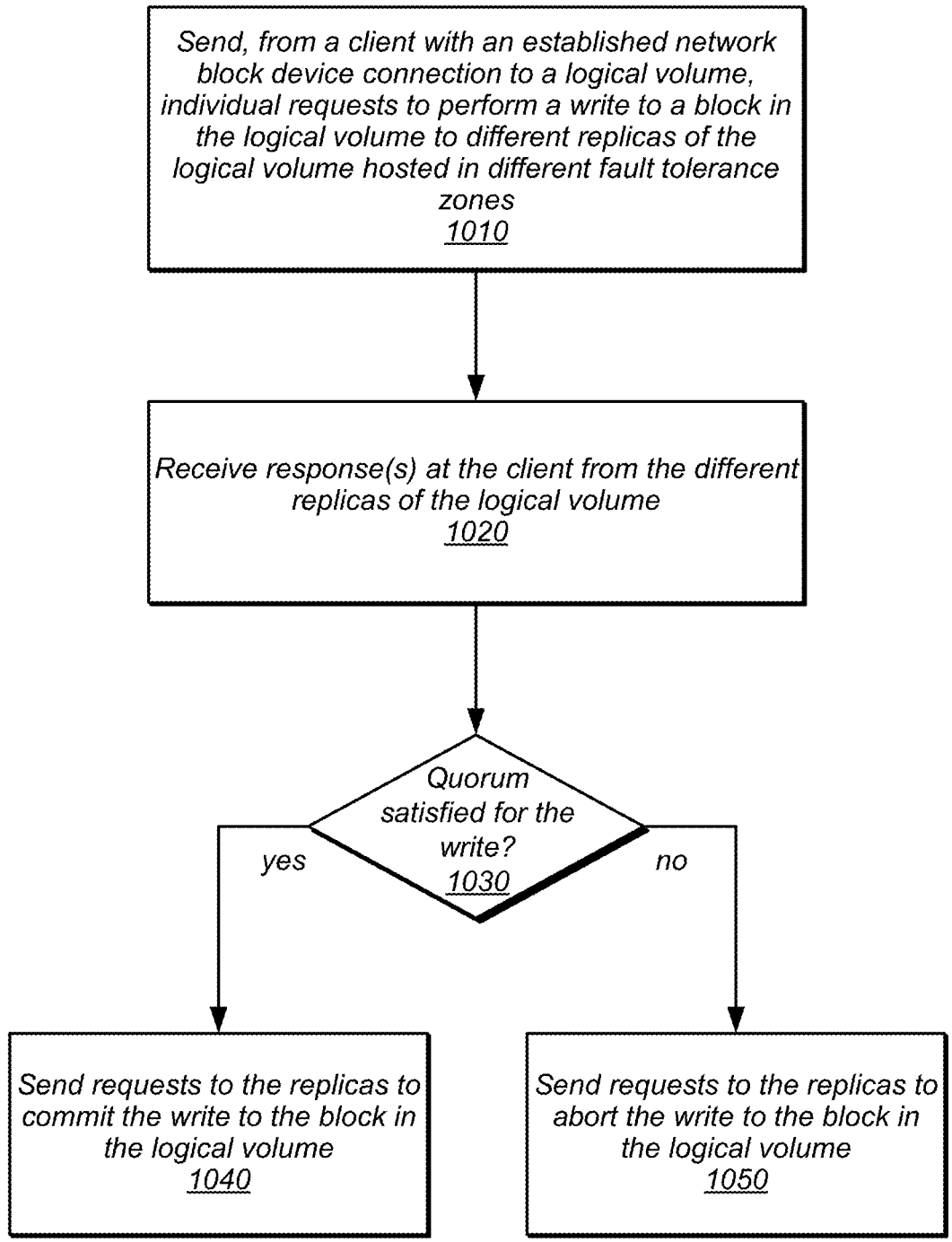
FIG. 10 is a high-level flowchart illustrating various methods and techniques for replicating data volume updates from clients accessing the data volume across fault tolerance zones, according to some embodiments.

The examples of implementing replicating data volume updates from clients accessing the data volume across fault tolerance zones as discussed above with regard to FIGS. 2-9D have been given in regard to resources offered by a service provider. Various other types or configurations of distributed systems or services may implement these techniques. For instance, other systems that implement logical data volumes across fault tolerance zones may implement these techniques. FIG. 10 is a high-level flowchart illustrating various methods and techniques for replicating data volume updates from clients accessing the data volume across fault tolerance zones, according to some embodiments. Various ones of the systems described above may implement some or all of these techniques.

Multiple clients located in different fault tolerance zones may connect, attach, or otherwise become authorized to access a same logical data volume, in various embodiments, such as by establishing network block device connections with the logical volume. Different replicas of the data volume may be implemented across the different fault tolerance zones. In some embodiments, the replicas may be evenly distributed. In other embodiments, different numbers of replicas may be implemented in different fault tolerance zones (e.g., in scenarios where a client is implemented in a fault tolerance zone with no replicas of the logical volume). As indicated at 1010, one of the clients may send a request to perform a write to a block in the logical volume to different replicas of the logical volume hosted in different fault tolerance zones. For instance, a single request may be sent to a single replica in each fault tolerance zone or requests may be sent to all replicas. In some embodiments, a user may specify the configuration for sending requests through a control interface (e.g., similar to the request discussed above with regard to FIG. 4). The request may, in some embodiments, include a logical sequence number (LSN), timestamp, or other value for determining ordering between multiple writers to a same block (e.g., other connected clients) in order to resolve conflicting writes (e.g., the earliest LSN for a write wins the right to access the block in the volume).

As indicated at 1020, response(s) from the different replicas of the logical volume may be received. The responses may indicate whether or not the write request may be performed (e.g., does not conflict) or accepted at the replica of a volume. Responses may be received at different times, in some scenarios, as replicas in other fault tolerance zones may take longer to receive a write request and respond.

As indicated at 1030, the responses may be evaluated to determine whether a quorum is satisfied for the write, in some embodiments. One or multiple criteria may be implemented. For example, in some embodiments, at least one replica in each fault tolerance zone may have to accept the write request. Such a criteria may be combined, in some embodiments, with a minimum number of replicas requirement (e.g., 3/4, 4/6, 4/5, etc.) across all volume replicas (e.g., one from each fault tolerance zone and 4/6 replicas overall). In at least some embodiments, the rule or policy for satisfying a quorum for a write request may ensure that a read quorum when satisfied will identify a consistent committed state for the logical volume.

As indicated by the positive exit from 1030, if the quorum is satisfied, then requests to the replicas may be sent to commit the write to the block in the logical volume, as indicated at 1040 in some embodiments. As indicated by the negative exit from 1030, if the quorum is not satisfied, then requests to the replicas may be sent to abort the write to the block in the logical volume, as indicated at 1050 in some embodiments. In other embodiments, one or more attempts to retry the write by resending write requests may be performed before or instead of sending the request to abort the write.

Figure 11:
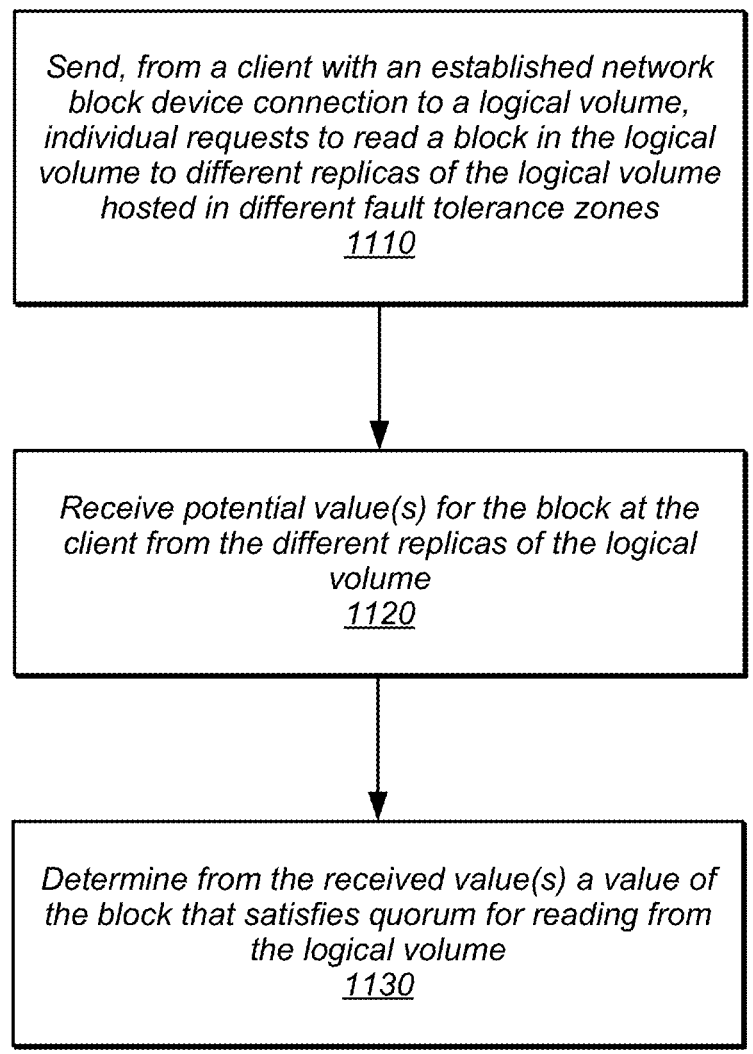
FIG. 11 is a high-level flowchart illustrating various methods and techniques for clients reading from the data volume across fault tolerance zones, according to some embodiments.

FIG. 11 is a high-level flowchart illustrating various methods and techniques for clients reading from the data volume across fault tolerance zones, according to some embodiments. As indicated at 1110, a client may send individual requests to read a block in a logical volume to different replicas of the logical volume hosted in different fault tolerance zones, in some embodiments. Similar to a write request, the read requests may be sent according to an ordering of replicas (e.g., closest replicas first) or to all replicas in parallel. In some embodiments, the read request may be sent in response to a read cache miss for the block, as discussed above with regard to FIG. 6.

As indicated at 1120, value(s) for the block may be received at the client from different replicas of the logical volume, in some embodiments. For example, each replica may send the current committed value of that block in the volume replica. In some embodiments, the current committed value may be generated by applying logged updates (as discussed above with regard to FIG. 7). As indicated at 1130, a determination may be made to as to whether the received value(s) satisfy quorum for reading from the logical volume, in some embodiments. For example, if the write quorum is 4/6 replicas, then if the responses from at least 3 replicas have the same value, then a 3/6 read quorum may be satisfied. If responses do not satisfy the quorum, then the read fails. In some embodiments, after a timeout without sufficient responses, the read request to the replicas may be retried (e.g., with additional replicas being sent the read request).

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of replicating data volume updates from clients accessing the data volume across fault tolerance zones as described herein may be executed on one or more computer systems, which may interact with various other devices. FIG. 12 is a block diagram illustrating an example computer system, according to various embodiments. For example, computer system 2000 may be configured to implement nodes of a compute service, system, host, node, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the service provider described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 22025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a service provider, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a first availability zone, including:
        a first plurality of replicas of a logical volume implemented on a first set of storage hosts;
        a first client of the logical volume having established first respective network block device connections with the first set of storage hosts and a second set of storage hosts that implement a second plurality of replicas of the logical volume on a second set of storage hosts in a second availability zone, wherein the first respective network block device connections are established responsive to a request to attach the logical volume to the first client received via a control interface; and
    the second availability zone, including:
        the second plurality of replicas of the logical volume implemented on a second set of storage hosts; and
        a second client of the logical volume having established second respective network block device connections with the second set of storage hosts and the first set of storage hosts, wherein the second network block device connections are established responsive to a request to attach the logical volume to the second client received via the control interface,
    wherein the first and second availability zones have separate data centers, power, and networking from one another;
    wherein the first client is configured to:
        send individual requests to perform a write to a block in the logical volume to the first plurality of replicas in the first availability zone and to the second plurality of replicas in the second availability zone;
        receive responses to the individual requests from one or more of the first plurality of replicas and the second plurality of replicas;
        evaluate the responses to determine that a quorum for the write request is satisfied; and
        send individual requests to commit the write to the block in the logical volume to the first plurality of replicas and the second plurality of replicas.

2. The system of claim 1, wherein one of the second set of storage hosts that implements one of the second plurality of replicas is configured to:
    detect a conflict between the write to the block in the logical volume received from the first client; and
    send, as the respective response for the individual request to write to the block, an indication of the conflict to the first client.

3. The system of claim 1, wherein at least one of the second plurality of replicas did not receive the write to the block in the logical volume, and wherein one of the second set of storage hosts that implement the second plurality of replicas or one of the first set of storage hosts that implement the first plurality of replicas is configured to send the write to the at least one storage host that did not receive the write as part of a gossip protocol, wherein the at least one storage host performs the write to the block received as part of the gossip protocol.

4. The system of claim 1, wherein the system further comprises a control plane, wherein the control plane is configured to:
    receive a request to create the logical volume as a multi-zone volume; and
    place the first plurality of replicas at the first set of storage hosts in the first availability zone and place the second plurality of replicas at the second set of storage hosts in the second availability zone.

5. The system of claim 1, wherein the system further comprises a control plane, wherein the control plane is configured to:

add a replica of the logical volume to the first availability zone; and send quorum information indicative of the added replica in the first availability zone to the first client and the second client.

6. A method, comprising:

sending, from a first client of a plurality of clients with established network block device connections to a logical volume in different fault tolerance zones, individual requests to perform a write to a block in the logical volume to different respective replicas of the logical volume hosted in the different fault tolerance zones, wherein at least one of the respective replicas of the logical volume is in a different one of the fault tolerance zones than the first client, wherein the network block device connections are established responsive to a request to attach the logical volume to the first client received via a control interface;

determining that a quorum to perform the write to the block is satisfied from responses to at least some of the sent respective requests to write to the block in the logical volume received from more than one of the different fault tolerance zones;

responsive to determining that the quorum to perform the write to the block is satisfied, sending, from the first client, respective requests to commit the write to the block in the logical volume to the different replicas of the logical volume hosted in the different fault tolerance zones.

7. The method of claim 6, further comprising:

sending, by a second client of the plurality of clients, individual requests to read the block in the logical volume to the different respective replicas of the logical volume hosted in the different fault tolerance zones;

receiving, at the second client, one or more potential values for the block responsive to the individual request to read the block; and from the received potential values, determining a value for the block that satisfies a quorum for reading from the logical volume.

8. The method of claim 7, further comprising:

before sending the individual requests to read the block in the logical volume to the different respective replicas of the logical volume hosted in the different fault tolerance zones, determining a miss in a cache for reading the logical volume for the block.

9. The method of claim 6, further comprising:

detecting a conflict for the write to the block for one of the plurality of different respective replicas according to a logical sequence number included in the request to perform the write received for the one respective replica; and wherein the respective response for the one respective replica indicates the conflict for the write.

10. The method of claim 6, further comprising:

receiving, at a control plane, a request to create the logical volume as a multi-zone volume; and placing, by the control plane, the different respective replicas of the logical volume in the different fault tolerance zones.

11. The method of claim 10, wherein the creation request specifies a quorum policy for the multi-zone volume, and wherein the method further comprises providing, by the control plane, the quorum policy to the plurality of clients.

12. The method of claim 6, further comprising:

removing, by a control plane, one of the different replicas of the logical volume from one of the different fault tolerance zones; and sending, by the control plane, quorum information indicative of the removed replica in the one different fault tolerance zone to the plurality of clients.

13. The method of claim 6, wherein at least one of the plurality of different respective replicas did not receive the write to the block in the logical volume, and wherein a storage host for another one of the different respective replicas sent the write to another storage host for the at least one replica of the logical volume as part of a gossip protocol, wherein the other storage host performs the write to the block received as part of the gossip protocol.

14. The method of claim 6, further comprising:

receiving, by a control plane, respective requests to attach the plurality of clients to the logical volume; and causing, by the control plane, the plurality of clients to establish network block device connections with respective storage hosts that store the respective plurality of replicas of the logical volume.

15. The method of claim 6, further comprising:

sending, by a second client of the plurality of clients, individual requests to write to the block in the logical volume to the different respective replicas of the logical volume hosted in the different fault tolerance zones;

receiving, at the second client, one or more responses to the individual requests to write to the block;

from the received one or more responses, determining, by the second client, that a quorum for the write request to the block is not satisfied; and sending, by the second client, individual requests to abort the write to the block in the logical volume to the different respective replicas of the logical volume hosted in the different fault tolerance zones.

16. One or more non-transitory, computer-readable storage media, storing program instructions that when executed on or across one or more computing devices cause the one or more computing devices to implement:

sending, from a first client of a plurality of clients with established network block device connections to a logical volume in different fault tolerance zones, individual requests to perform a write to a block in the logical volume to different respective replicas of the logical volume hosted in the different fault tolerance zones wherein the second plurality of replicas are hosted in a different fault tolerant zone than the first client, wherein the network block device connections are established responsive to a request to attach the logical volume to the first client received via a control interface;

determining that a quorum to perform the write to the block is satisfied from responses to at least some of the sent respective requests to write to the block in the logical volume received from more than one of the different fault tolerance zones; and responsive to determining that the quorum to perform the write to the block is satisfied, sending, from the first client, respective requests to commit the write to the block in the logical volume to the different replicas of the logical volume.

17. The one or more non-transitory, computer-readable storage media of claim 16, wherein the one or more non-transitory, computer-readable storage media comprise further instructions that when executed by the one or more computing devices cause the one or more computing devices to further implement:

sending, by the first client of the plurality of clients, individual requests to read another block in the logical volume to the different respective replicas of the logical volume hosted in the different fault tolerance zones;

receiving, at the first client, one or more potential values for the other block responsive to the individual request to read the other block; and from the received potential values, determining a value for the other block that satisfies a quorum for reading from the logical volume.

18. The one or more non-transitory, computer-readable storage media of claim 16, wherein the one or more non-transitory, computer-readable storage media comprise further instructions that when executed by the one or more computing devices cause the one or more computing devices to further implement:

sending, by the first client of the plurality of clients, individual requests to perform a write to another block in the logical volume to the different respective replicas of the logical volume hosted in the different fault tolerance zones;

receiving, at the first client, one or more responses to the individual requests to write to the other block;

from the received one or more responses, determining, by the first client, that a quorum for the write request to the other block is not satisfied; and retrying, by the first client, the individual requests to perform the write to the other block in the logical volume to the different respective replicas of the logical volume hosted in the different fault tolerance zones.

19. The one or more non-transitory, computer-readable storage media of claim 16, wherein the determination of the quorum is performed according to a quorum policy for the logical volume, and wherein the one or more non-transitory, computer-readable storage media comprise further instructions that when executed by the one or more computing devices cause the one or more computing devices to further implement receiving the quorum policy at the first client from a control plane.

20. The one or more non-transitory, computer-readable storage media of claim 16, wherein the one or more non-transitory, computer-readable storage media comprise further instructions that when executed by the one or more computing devices cause the one or more computing devices to further implement receiving an instruction to establish network block connections with respective storage hosts for the different respective replicas of the logical volume.

21. The one or more non-transitory, computer-readable storage media of claim 16, wherein the logical volume is implemented as part of a virtual block-based storage service of a service provider, wherein the plurality of clients are implemented as virtual compute instances of a virtual compute service implemented as part of the service provider.

\* \* \* \* \*